United States Patent [19]

Nakamura et al.

[11] Patent Number: 4,710,436
[45] Date of Patent: Dec. 1, 1987

[54] MOLTEN CARBONATE FUEL CELL AND METHOD OF MANUFACTURING ELECTROLYTE PLATE THEREOF

[75] Inventors: Junji Nakamura; Ikuma Nishimura; Goro Saito, all of Tokyo; Kozo Matsumoto, Kanagawa, all of Japan

[73] Assignees: Toppan Printing Co., Ltd; Fuji Electric Co., Ltd., both of Japan

[21] Appl. No.: 867,406

[22] Filed: May 14, 1986

Related U.S. Application Data

[63] Continuation-in-part of Ser. No. 716,421, Mar. 27, 1985, abandoned.

[51] Int. Cl.$^4$ .............................................. H01M 8/14
[52] U.S. Cl. ..................................... 429/41; 29/623.5; 429/46
[58] Field of Search ...................... 429/16, 41, 46, 188; 29/623.5

[56] References Cited

U.S. PATENT DOCUMENTS

| | | | |
|---|---|---|---|
| 4,115,632 | 9/1978 | Kinoshita et al. | 429/188 |
| 4,216,278 | 8/1980 | Arendt et al. | 429/188 |
| 4,526,845 | 7/1985 | Reiser et al. | 429/41 |

FOREIGN PATENT DOCUMENTS 2108099  5/1983  United Kingdom ................. 429/16

Primary Examiner—Donald L. Walton
Attorney, Agent, or Firm—Sughrue, Mion, Zinn, Macpeak, and Seas

[57] ABSTRACT

A molten carbonate fuel cell is disclosed, which includes a γ-lithium aluminate porous electrolyte plate composed of a γ-lithium aluminate porous sheet having fine, continuous pores having diameters distributed in a range of from 0.05 μm, at least 60% of said fine pores having diameters distributed in a range of from 0.05 μm to 0.5 μm, and having an average diameter of not more than 0.2 μm and a porosity of 50-70% and molten carbonate electrolyte impregnating the porous sheet. A method of manufacturing the electrolyte plate is also disclosed.

10 Claims, 16 Drawing Figures

MOLTEN CARBONATE FUEL CELL AND METHOD OF MANUFACTURING ELECTROLYTE PLATE THEREOF

This is a continuation-in-part of application Ser. No. 716,421, filed Mar. 27, 1985, which is now abandoned.

BACKGROUND OF THE INVENTION

The present invention relates to a fuel cell using a molten carbonate electrolyte and a method of manufacturing an electrolyte plate for use in the fuel cell.

A fuel cell which utilizes molten carbonate as electrolyte and operates at a high temperature (500° C.–800° C.) has been used widely because there is no need of use for expensive catalysts such as plutonium which is necessary in a fuel cell operating at normal temperature and it is possible to obtain a high current density even if inexpensive fuel, whose reaction is usually hard to occur at normal temperature, is used.

An example of the structure of such molten carbonate fuel cell is shown in FIG. 1, in cross section. In FIG. 1, the fuel cell comprises an electrolyte plate 1, an anode electrode 2 of porous nickel or nickel alloy disposed on one surface of the electrolyte plate 1, a cathode electrode 3 of porous nickel oxide disposed on the other surface of the electrolyte plate 1 and a pair of cell frames 4 for defining a fuel gas chamber 10 and an oxidation agent chamber 11 in the sides of the anode electrode 2 and the cathode electrode 3, respectively. These components are assembled between a pair of pressing plates 5 through insulating plates 6 and fixed together by bolts 7 and nuts 8 as shown. The fixedly assembled fuel cell is put in a furnace to heat it up to a temperature around 650° C. and fuel gas and oxidizing agent are supplied continuously to the fuel gas chamber 10 and the oxidizing agent chamber 11, respectively. Electric energy produced between the electrodes 2 and 3 proportionally to areas thereof is derived through lead wires 12 connected suitably to the electrodes.

When alkali metal carbonate is used as the electrolyte and the fuel cell is operated at a temperature in a range from 500° C. to 800° C., an electrochemical reaction therein proceeds at a high reaction rate according to the following formula and the ion conduction is performed by carbonic ions ($CO_3^{2-}$).

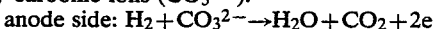
anode side: $H_2 + CO_3^{2-} \rightarrow H_2O + CO_2 + 2e$

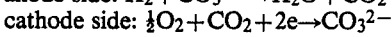
cathode side: $\frac{1}{2}O_2 + CO_2 + 2e \rightarrow CO_3^{2-}$

However, the operating temperature is so high and alkali metal carbonate is so corrosive that many problems that occur in the electrodes, the electrolyte plate and other elements such as the cell frames etc. For example, there may be degradation of electrochemical chracteristics of the electrode due to growth of nickel particles constituting the electrodes and corrosion thereof, breakage of the electrolyte plate during assembling thereof or due to heat cycle thereof, degradation of electrolyte holding capability thereof, and corrosion of other constituent elements. Inter alia, these problems occuring in the electrolyte plate affect the performance of the fuel cell substantially. That is, defects of the electrolyte plate, such as holes or cracks may cause undesirable mixing of fuel gas and air during the operation of the cell, which causes an output performance of the fuel cell to be lost.

In order to improve the performance of the fuel cell, the electrolyte plate of such molten carbonate fuel cell should have a large area and should satisfy all of the requirements of high mechanical strength, high heat cycle durability, high heat-resistivity, high stability of holding electrolyte and high ion conductivity.

On the other hand, the cost of the electrolyte plate occupies a high percentage of the total cost of the fuel cell. Therefore, in order to reduce the total cost, the cost of the electrolyte plate should be restricted to as low as possible.

The electrolyte plate comprises an electrolyte holding member and electrolyte such as alkali metal carbonate to be held thereby. As the electrolyte holding member, lithium aluminate produced by mixing alumina and lithium carbonate according to a carbonate mixing method etc. has been considered as an optimum material therefor. Lithium aluminate includes three isotopes, i.e., α-lithium aluminate, β-lithium aluminate and γ-lithium aluminate. Particularly, β-lithium aluminate or γ-lithium aluminate is used for the electrolyte holding member in view of the mechanical strength thereof.

As the electrolyte, a mixture of lithium carbonate and potassium carbonate which are eutectic materials has been used among other alkali metal carbonates. The eutectic constitution ratio of them in weight percentage is 47.5% lithium carbonate −52.5% potassium carbonate and the eutectic temperature is about 491° C. Further, the weight ratio of the electrolyte to the lithium aluminate electrolyte holding member is usually 50% to 60%.

Such an electrolyte plate may be manufactured according to various methods including the so-called paste method in which a mixture of γ-lithium aluminate powder and electrolyte powder containing eutectic materials is press shaped at normal temperature and then sintered at about 500° C., the so-called hot press method in which the mixture powder is pressed under 0.6–1.0 ton/cm² at 460° C.–490° C. for 15–150 minutes and the so-called matrix method in which γ-lithium aluminate powder, together with a binder, is press shaped under 1–3.5 ton/cm² and then sintered to form a matrix and the latter is immersed in a molten electrolyte.

An electrolyte plate manufactured according to the paste method is easily cracked by increased pressure. Further, in order to avoid cracking during the sintering, increasing and decreasing rates of temperature must be selected very carefully, causing the producibility thereof to be low. In addition thereto, since the bulk density of the electrolyte plate obtained by this method is about 85% of the critical value at most, the mechanical strength thereof is low and thus it is easily cracked or damaged during the heat cycle of the full cell.

The hot press method is advantageous over the paste method in that it is possible to increase the bulk density of the electrolyte plate and the mechanical strength thereof is higher. However, the improvement of the bulk density requires an increased pressing force and therefore a large press machine is necessary, which is very expensive. It is also necessary in the hot press method to select the varying rates of temperature very carefully. In addition, these methods are not suitable to provide an electrolyte plate having a large area.

The matrix method includes the so-called doctor blade method, the calender method and the electrophoresis method etc. Although these methods make the area of the electrolyte plate larger easily comparing with the paste method or the hot press method, the manufacturing process of each of them is complicated and includes a high temperature sintering step, causing the manufacturing cost to be high and the matrix in the pressing step exhibits a very low mechanical strength and the resultant matrix is fragile. In addition, since the binder contains toxic organic substances, special considerations must be taken for workers' safety.

Therefore, none of the electrolyte plates manufactured by these methods satisfy all the requirements mentioned previusly and thus the molten carbonate fuel cell equipped with the electrolyte plate manufactured by any of the methods exhibits an insufficient output power. Since the mechanical strength, heat resistivity and heat cycle durability etc. of the connectional electrolyte plate are low, the fuel cell must be heated to its operating temperature of 650° C. at a rate as low as 60° C./hour, otherwise the electrolyte plate may be damaged.

As another method of manufacturing such a ceramic porous sheet, a method is known in which the foaming of soft urethane is utilized to form continuous pores in the ceramic sheet. The ceramic sheet obtained according to this method is usually insufficient in view of hardness and density and, when filled with electrolyte, provides insufficient ion mobility and electron conduction. Even if the problems of ion mobility and electron condition are resolved, electrolyte therein easily leaks away because the average size of the pores is considerably large.

According to a further conventional method, a mixture of $\alpha$-alumina and 50-70 wt% wood pulp is shaped into a sheet and the sheet is burned. According to this method, a thin and dense porous sheet can be obtained. However, due to the uses of $\alpha$-alumina and such large amount of wood pulp selected in order to obtain a high porosity, the burning must be performed at a temperature as high as 1500° C. to 1600° C., otherwise sufficient mechanical strength of the sheet can not be obtained.

This method corresponds to that described in Japanese Unexamined Patent Application Publication No. 33273/1985 published Feb. 20, 1985. In this reference, a porous plate prepared by sintering a green sheet containing a large amount of wood pulp (51 to 70 wt%) has pores, the size of which are too large to hold molten carbonate electrolyte, making it impossible to use in a molten carbonate fuel cell (MCFC).

U.S. Pat. No. 4,526,845 and U.K. Patent Application No. GB 2 108 099 A use lithium aluminate in fabricating a porous plate. However, the porous plate of these two references is prepared by burning at about 600° C. At this temperature, lithium aluminate cannot be sintered, the melting point of lithium aluminate being 1625° C. Thus, these plates have no self-supporting nature. Further, U.S. Pat. No. 4,526,845 uses a temporary plastic binder such as polyvinyl butyral in the form of particles. Thus, any pores obtained by burning the binder are spherical in shape even though they are communicated with each other. Also, because the $\gamma$-lithium aluminate is not sintered, the resultant spherical pores correspond in shape to the binder particles.

Thus, in U.S. Pat. No. 4,526,845, the $\gamma$-lithium aluminate which is in the form of inert particles and which is 40-45% of the volume of the matrix before burning, is not sintered. Further, the matrix tape is heated up to 650° C., which is as low as the operating temperature of the fuel cell. Therefore, the matrix of U.S. Pat. No. 4,526,845 might take the form of an electrolyte plate obtainable by the hot press method. However, the rigidity is then maintained by filling of the gaps between particles with electrolyte. The rigidity is not maintained by the mutual adhesion of lithium aluminate particles. Thus, the plate is not durable against a heat cycle.

Because the mechanical strength of this matrix is low and so easily broken, the bubble barrier layer is laminated to prevent gas-crossover through cracks of the matrix due to the heat cycle. That is, the mechanical strength of the matrix of U.S. Pat. No. 4,526,845 depends upon the nature of the barrier layer.

An injection molding, an extrusion molding and a hydrostatic pressing are other methods of manufacturing the ceramic sheet.

In any of the conventional methods it is very difficult to manufacture a satisfactory ceramic sheet having a area of 30 cm² or more.

SUMMARY OF THE INVENTION

An object of the present invention is to provide a molten carbonate fuel cell having a porous electrolyte plate which contains molten carbonate and has a large area, and which exhibits a high mechanical strength, is easily manufactured and contributes substantially to improvement in performance of the fuel cell.

According to the present invention, the above object can be achieved by providing a molten carbonate fuel cell comprising a porous anode plate; a fuel gas chamber defined on one surface of said anode plate and adapted to supply fuel gas to said one surface of said anode plate; a porous cathode plate; an oxidation agent chamber defined on one surface of said cathode plate and adapted to supply an oxidation agent to said one surface of said cathode plate; a sintered porous ceramic plate disposed in between the other surface of said anode plate and the other surface of said cathode plate in intimate contact therewith, said porous ceramic plate being formed with a number of fine continuous pores having diameters distributed in a range from 0.05 $\mu$m, at least 60% of said fine pores having diameters distributed in a range from 0.05 $\mu$m to 0.5 $\mu$m, said fine pores having an average diameter of not more than 0.2 $\mu$m to provide a porosity of 50-70%, said fine pores communicating one surface of said ceramic plate with the other; molten carbonate electrolyte that fills said fine pores of said sintered porous ceramic plate; and means for continuously supplying fuel gas and oxidizing agent to said fuel gas chamber and said oxidizing agent chamber, respectively.

Another object of the present invention is to provide a method of manufacturing the porous electrolyte plate.

The above object is achieved, according to the present invention, by providing a method of manufacturing an electrolyte plate for use in a molten carbonate fuel cell, comprising the steps of:

preparing a water slurry containing a predetermined amount of $\gamma$-lithium aluminate powder having an average particle size of not larger than 1 $\mu$m and a predetermined amount of organic textile material, adding a flocculating agent to said slurry to flocculate said $\gamma$-lithium aluminate powder on said organic textile materials and forming a wet sheet thereof by using a paper making technique, dehydrating said wet sheet to form a shaped sheet of $\gamma$-lithium aluminate containing 3-5 wt% organic textile material, burning said shaped sheet in an oxidizing atmosphere maintained at a temperature in a range from 1100° C. to 1300° C. to evaporate and remove said organic textile materials to thereby form a sintered $\gamma$-lithium aluminate porous sheet having fine labyrinthine and continuous pores, and impregnating said lithium aluminate porous sheet with molten carbonate electrolyte.

The γ-lithium aluminate porous plate has fine, continous pores which are capable of holding molten carbonate electrolyte without leakage thereof.

An area of the shaped sheet can be easily made large to the extent limited by the current paper manufacturing technique, facilitating a provision of a large scale fuel cell, and the shaped sheet before burning is flexible and easily handled. The ceramic porous plate obtained by burning the shaped sheet exhibits a high porosity and a high mechanical strength.

DETAILED DESCRIPTION OF PREFERRED EMBODIMENT 1000 parts of water and a predetermined amount of organic fiber material are put in a suitable container and agitated for about 20 minutes to wet the fibre material sufficiently. A predetermined amount of inorganic powder which can be sintered is added to the content of the container and agitated for about one minute to prepare a water slurry.

30 parts of preliminarily prepared anionic polyacrylamide based high molecular flocculant (e.g. 2% aqueous solution of Sanfloc AH-200P (tradename) of Sanyo Kasei Kogyo (K.K.)) and 30 parts of preliminarily prepared cationic polyacrylamide based high molecular flocculant (e.g. 0.2% aqueous solution of Sanpoly N-500 (tradename) of Sanyo Kasei Kogyo K.K.) are added to the water slurry and agitated for about 1 minute to flocculate the inorganic particles on the organic fibre material.

The water slurry is paper-processed and made as a sheet having a thickness of 1 mm to 5 mm and area of 10 cm×10 cm to 30 cm×30 cm according to demand. The addition of such flocculant is to facilitate the paper process and to make surfaces of the sheet uniform and smooth.

The resultant sheet contains 40-80 wt% water content and is dehydrated so as to make handling thereof easy.

In order to keep the uniform and smooth surface of the sheet, the dehydration is performed while pressing it by a press machine with a pressing force in a range of 30-200 Kg/cm$^2$. It may be advisable to increase a temperature of the press machine from, for example, 60° C. to 150° C. gradually or steppingly, during its operation.

The dehydrated sheet is put in an electric furnace and burned in an oxidizing atomosphere the temperature of which is increased from normal temperature at a rate of 100° C./hour to burn out the organic fibre material in the sheet to thereby make the latter porous with fine tangled pores. In this case, the burning may be performed in flowing air, if necessary. Then the temperature is further increased to a value at which the sintering of the organic powder is performed, at a rate 50° C.-200° C./hour, and the porous sheet is maintained at the sintering temperature for 1 to several hours, resulting in a sintered porous plate having a desired porosity which is 50-70%.

The sintered porous plate with an electrolyte containing eutectic materials (47.5 wt% $Li_2CO_3$-52.5 wt% $K_2CO_3$) disposed thereon is put in an oxidizing atomosphere in an electric furnace, heated, at a rate 60° C./hour, to a temperature in a range 500° C.-650° C. and maintained at the latter temperature for about 1 hour so that the electrolyte permeates the porous plate, resulting in an electrolyte plate.

As described previously, the pores of the present plate are labyrinthine. That is, the pores have thin cross sections, respectively, and are interconnected.

Figure 15:
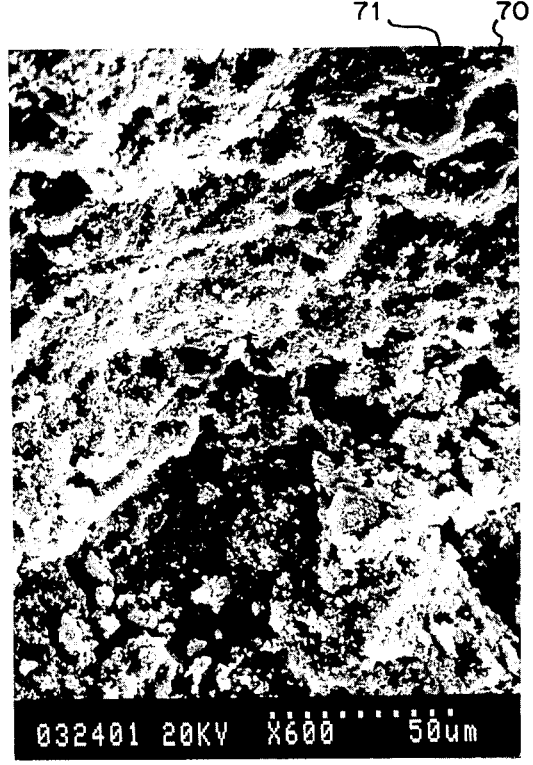
FIGS. 15 and 16 are electron microscope photographs of the planes of the ceramic plate of this invention.
Figure 16:

FIGS. 15 and 16 are electron microscope photographs of planes of the ceramic plate in which pores shown by a numeral 71 are left in gaps between sintered lithium aluminate particles 70 by evaporation of tangled organic fiber material. These plates were formed using an average γ-$LiAlO_2$ particle size of 0.1 μm, an amount of pulp of 10 wt%, a pressure (during dehydration) of 100 Kg/cm$^2$ and a sintering temperature of 1200° C. Each pore provided by evaporation of pulp may be filled with a minute amount of molten lithium aluminate during sintering, with the result that the shape of the pore after sintering may be different from that before sintering and, together with the special shape of the tangled fibers, provides thin labryinthine pores.

Figure 1:
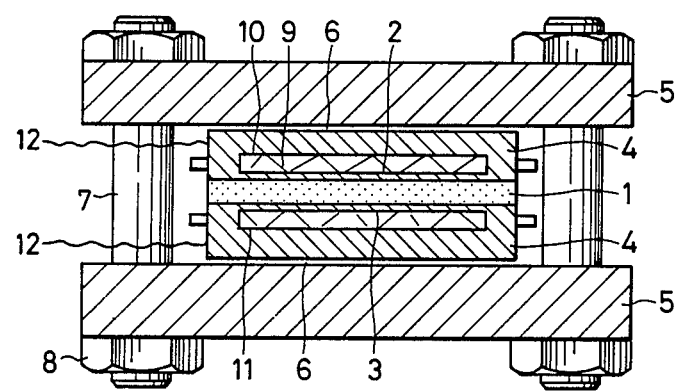
FIG. 1 is a cross section of a molten carbonate fuel cell having a conventional electrolyte plate.

A fuel cell is assembled using the electrolyte plate obtained as above, the structure being the same as that shown in FIG. 1. The unit cell tests of the fuel cell were conducted to evaluate the electrochemical characteristics of the fuel cell with disc shaped anode and cathode electrodes of porous nickel, the diameter being 35 mm, the present electrolyte plate in the form of a disc having a diameter of 50 mm and thickness of 1.5 −2.0 mm, the fuel gas of a mixture of 80% hydrogen gas and 20% $CO_2$ and the oxidizing agent of a mixture of 70% air and 30% $CO_2$.

EXPERIMENT 1

γ-lithium aluminate of various average particle sizes were prepared by using γ-Al$_2$O$_3$ mixed according to the carbonate mixing method.

Figure 2:
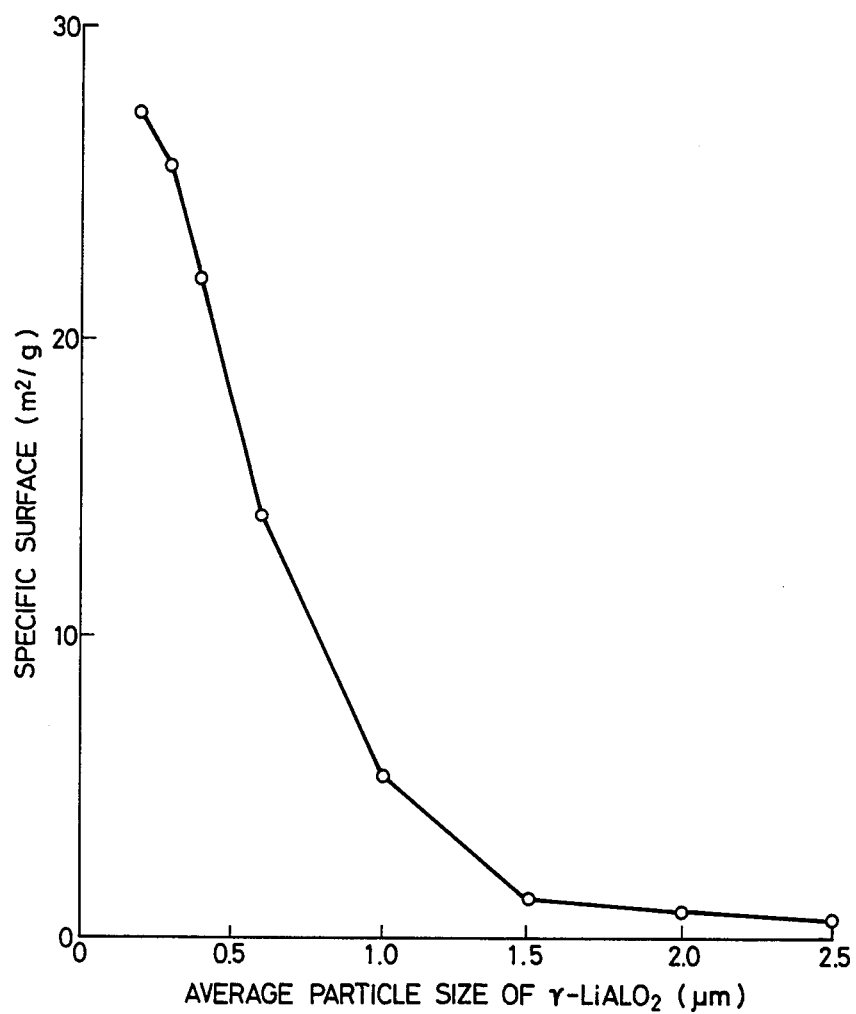
FIG. 2 is a graph showing a relation of an aeverage particle size of γ-lithium aluminate to a specific surface thereof.

Specific surfaces of γ-lithium aluminate of the various average particle sizes were measured, a result of which is shown in FIG. 2. As is clear in FIG 2, the specific surface of γ-lithium aluminate increases exponentially with a reduction of the average particle size.

Then, porous plates of γ-lithium aluminate of various particle sizes were prepared according to the process mentioned previously with wood pulp content of the wet sheets being 15 wt% constant and sintering conditions being 1200° C. for 1 hour commonly.

Figure 3:
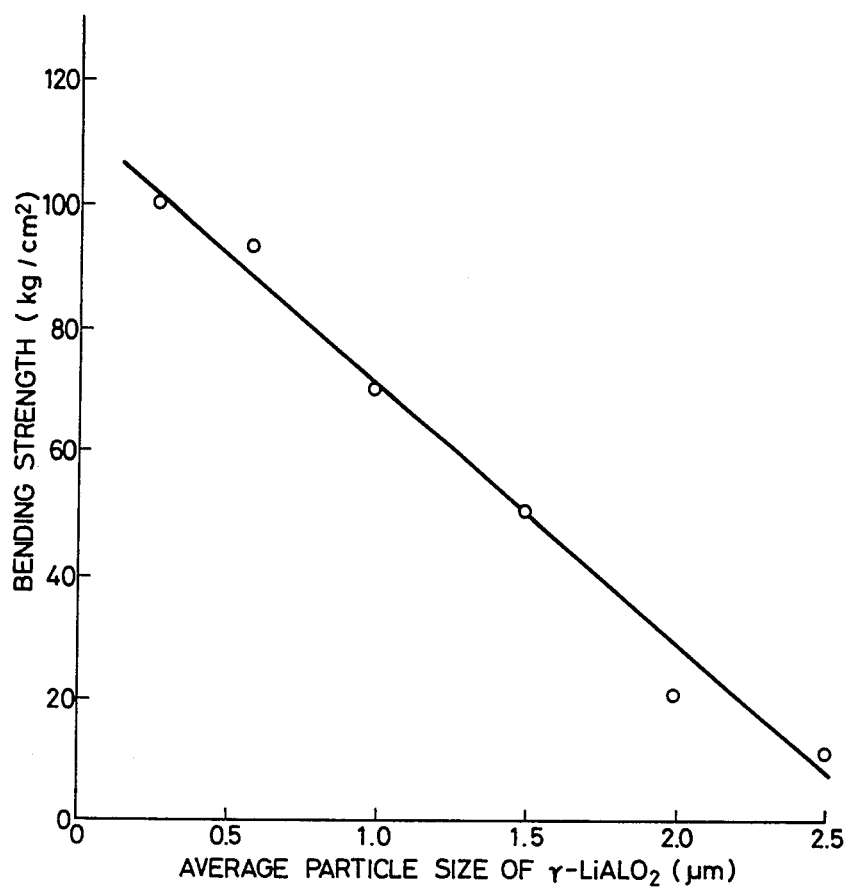
FIG. 3 is a graph showing a relation of the average particle size of γ-lithium aluminate to a bending strength of a γ-lithium aluminate porous plate.

Resultant γ-lithium aluminate porous plates were tested for bending strength with the particle size being a parameter, a result of which is shown in FIG. 3. As is clear from FIG. 3, the bending strength of the porous plate decreases linearly with increase of the average particle size.

Then, the porous plates were filled with an electrolyte of the eutectic carbonates under conditions of 550° C. for 1 hour to form electrolyte plates, during which the carbonate filling characteristics and cracking were monitored.

Thereafter, these electrolyte plates were incorporated in the unit fuel cell and the latter was tested under the conditions mentioned previously. The result is shown in Table 1.

TABLE 1

| average particle size of γ-lithium aluminate (μm) | specific surface (m$^2$/g) | amount of pulp added (%) | porosity of porous sheet (%) | bending strength (kg/cm$^2$) | electrolyte impregnation rage (%) | cracking during impregnation | fuel cell output (V) |
|---|---|---|---|---|---|---|---|
| 0.3 | 30.5 | 15 | 55.0 | 100 | 99.5 | None | 0.75 |
| 0.6 | 14.2 | " | 56.5 | 93 | 99.0 | None | 0.76 |
| 1.0 | 5.7 | " | 63.5 | 70 | 99.0 | None | 0.81 |
| 1.5 | 1.6 | " | 65.0 | 50 | 91.5 | Partially cracked | 0.55 |
| 2.0 | 1.1 | " | 69.8 | 20 | 82.0 | cracked | — |
| 2.5 | 0.8 | " | 72.5 | 20 | 78.0 | cracked | — |

Note(1)
electrolyte impregnation rate is calculated from a ratio of a volume of electrolyte impregnated to a void volume. The larger the value is the better the impregnation.
Note(2)
fuel cell output value is at current density of 150 mA/cm$^2$.

From the above mentioned results of various tests performed in the experiment, it is clear that when the average particle size of γ-lithium aluminate is 1.5 μm or more, there is cracking of the electrolyte plate. Since the cracking during the impregnation depends upon the mechanical strength of the porous plate, it may be possible to prevent the cracking from occuring in the electrolyte plate whose porous plate is mechanically strong. Therefore, the bending strength of the porous plate of the present invention should be at least 70 Kg/cm$^2$ and, in order to realize the latter bending strength, the average particle size of γ-lithium aluminate should be not more than 1 μm. With the average particle size of not more than 1 μm, the impregnation of electrolyte and hence the electrolyte holding capability of the porous plates are much improved and thus the performance of the resultant fuel cell is satisfactory.

EXPERIMENT 2

In order to determine the kind of organic textile material and the amount thereof in γ-lithium aluminate, an experment was conducted.

The paper manufacturing method used in the present method of manufacturing the electrolyte plate comprises the steps of making a floc of fibre, resin, inorganic powder dispersed in water and filtering the floc with a plane cloth or the like to form a sheet having substantially uniform thickness. The fibre and resin are necessary to flocculating the inorganic powder, γ-lithium aluminate powder in this case. As to the fibre, it should be well branched, tangled with others mutually and easily burned out.

In view of the above requirements, synthetic fibre such as acrylic fibre, acetate fibre, nylon fibre or vinylon fibre, natural fibre such as wool, silk, hemp or cotton and wood pulp may be used. However, synthetic fibre is usually thick and hardly tangled mutually and natural fibre is usually expensive and too soft to handle. On the contrary, wood pulp is inexpensive, thin in diameter and easily tangled mutually. Therefore, the wood pulp is most suitable among others.

The minimum amount of wood pulp necessary to allow the paper making method to be used and to make the handling of the resultant sheet easy may be 2%. However, the amount thereof is determined by taking the porosity of the porous plate and the bending strength thereof into consideration.

Figure 4:
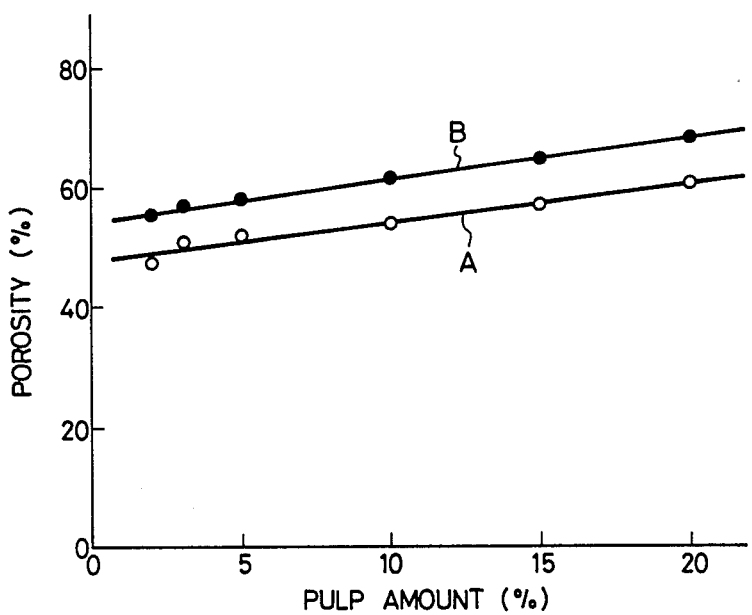
FIG. 4 is a graph showing a relation of the porosity of a γ-lithium aluminate porous plate to the amount of pulp added thereto.
Figure 5:
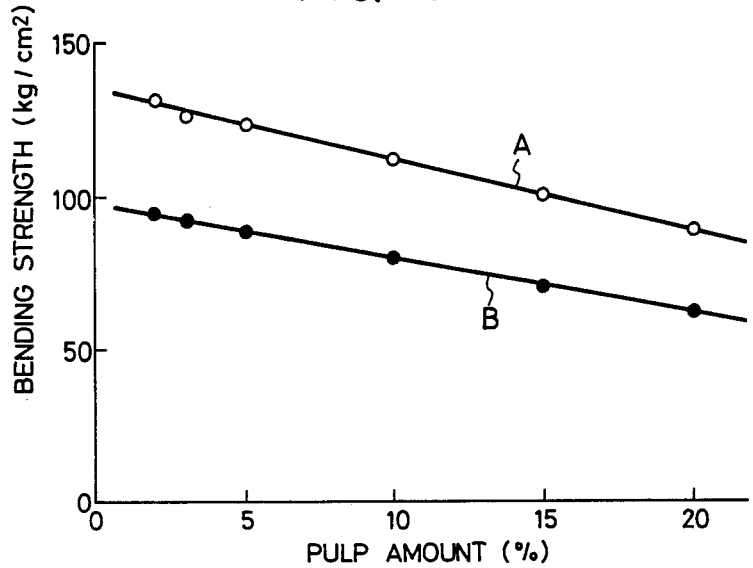
FIG. 5 is a graph showing a relation of the bending strength of the γ-lithium aluminate porous plate to the amount of pulp.

Curves in FIG. 4 show the porosities of porous plates contaning γ-lithium aluminate whose average particle size are 0.3 μm and 1.0 μm, respectively, and being prepared by burning the shaped sheets prepared by the paper making method, at 1200° C., the amount of wood pulp in the shaped sheet being varied and curves in FIG. 5 show the bending strength thereof. In these figures, curves A show results for the average particle size of γ-lithium aluminate being 0.3 μm and curves B for 1.0 μm.

As is clear from these figures, the requirements of 50–70% porosity and more than 70 Kg/cm$^2$ bending strength can be satisfied when the amount of wood pulp is in a range 3–15 wt%. Although the porosity and the bending strength depend, more or less, upon the average particle size of γ-lithium aluminate, the bending strength and the porosity changes oppositely to each other with change of the amount of wood pulp. For example, when the amount of wood pulp is smaller than 3%, the bending strength is large enough while the porosity becomes smaller than 50% and when the amount of wood pulp is larger than 15%, the porosity becomes enough while the bending strength becomes too small. If the bending strength is smaller than 70 Kg/cm$^2$, the possibility of cracking or breaking of the plate during the impregnation of the electrolyte thereinto as mentioned with respect to Experiment 1.

Therefore, the amount of wood pulp added to lithium aluminate should be such that the shaped sheet contains 3–15% wood pulp.

On the other hand, the size of the continuous fine pores formed in the porous plate is an important factor in improving the electrolyte holding capability of the plate to both surfaces of which the porous anode and cathode electrode plates are attached. The diameter of the fine pores of such electrode plates to be used in the molten carbonate fuel cell is distributed in a range from 0.1 μm to 30 μm and the average pore diameter may be 2–10 μm.

A measurement of the average pore diameter of the present porous γ-lithium aluminate plate showed a value not more than 0.2 μm. This means that the pore diameter of the present porous plate is distributed in a range 0.05–8 μm which overlaps on only lower portion of the distribution range of the pore diameter of the electrode plate and hence immigration of electrolyte in the present porous plate to the electrode plates is restricted substantially.

If the average diameter of the pores of the present plate exceeds 0.2 μm and thus the distribution range thereof is shifted to a larger side, the overlapping range may be increased, causing an increase of immigration of the electrolyte to the electrode plates. Therefore, the average diameter of not more than 0.2 μm provided for the present porous plate is advantageous to reduce leakage of electrolyte to the electrode plates.

EXPERIMENT 3

The effect of the sintering temperature on the porous γ-lithium aluminate plate is considered.

The melting point of lithium aluminate is 1625° C. and the sintering temperature is generally selected from a range 1300° C.–1400° C. which is lower than the melting point by 200°–300° C.

When a γ-lithium aluminate sheet containing wood pulp and prepared by the paper making technique is burned in an oxidizing atomosphere in an electric furnace, the wood pulp is burned out and evaporated at around 400° C. The sintering of the remaining γ-lithium aluminate is enhanced at 1000° C. or higher, while reducing the size thereof gradually and hence increasing the bending strength gradually.

Figure 6:
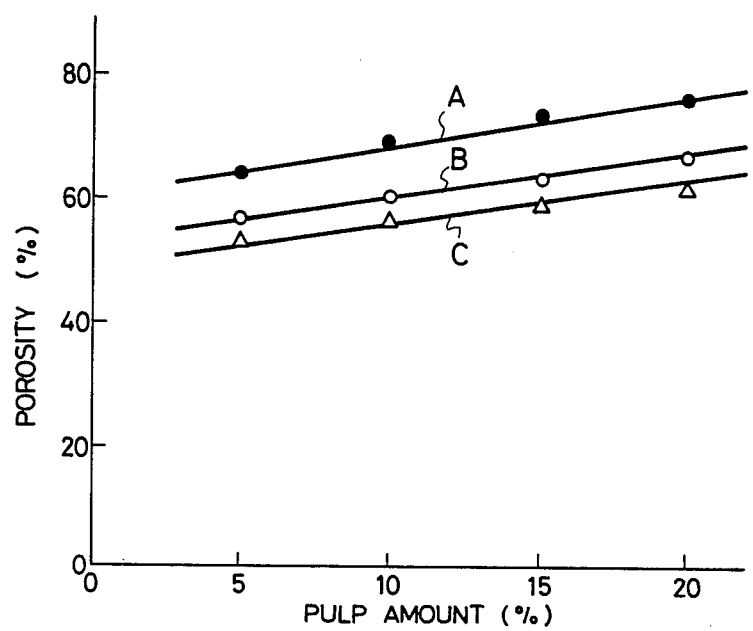
FIG. 6 is a graph showing relations of the amount of pulp to the porosity of γ-lithium aluminate porous plates burned at different temperatures.
Figure 7:
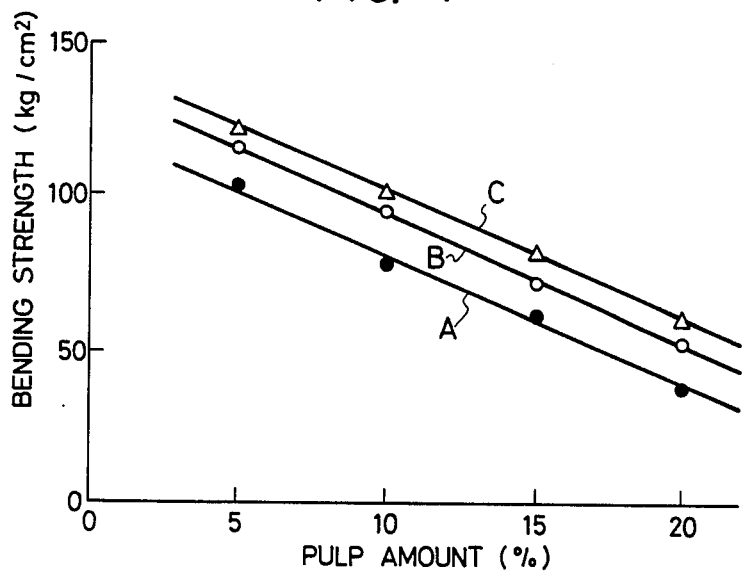
FIG. 7 is a graph showing relations of the amount of pulp to the bending strength of γ-lithium aluminate porous plates burned at different temperatures.

FIG. 6 shows a relation between the porosity and the amount of wood pulp, and FIG. 7 shows a relation between the bending strength and the pulp amount. In these figures, curves A are for the γ-lithium aluminate porous plate sintered at 1100° C. for 1 hour, curves B for plates sintered at 1200° C. 1 hour and curves C for those sintered at 1300° C. for 1 hours.

Although the porosity and the bending strength of the plate depend upon the amount of the wood pulp, it is clear that the bending strength of 70 Kg/cm² or more can be obtained thereby exhibiting a self-supporting nature even with the sintering temperature as low as 1100° C., when the pulp amount is not more than 10% and with the distribution of pore size being mainly in the range of from 0.05 to 0.5 μm, as shown in Table 1. With the sintering temperature of 1300° C., the sintering is facilitated and when the pulp amount is small, the porosity becomes about 50%.

While not wanting to be bound by the following explanation, the inventors believe that since lithium aluminate forming the present plate is sintered at a temperature as high as 1100° C. to 1300° C., there may be a diffusion reaction of atoms in contact areas of the lithium aluminate particles so that the particles are rigidly adhered to each other without substantial reduction of the porosity provided by the evaporation of pulp and thus the resultant plate is highly rigid even without additional mechanical support such as impregnation with electrolyte.

From a view point of crystallography, when the sintering temperature exceeds 1300° C., lithium aluminate becomes $LiAl_5O_8$, regardless of the starting crystal structure as shown in Table 2 below.

TABLE 2

| starty crystal structure | temp. | | | |
|---|---|---|---|---|
| | ~250° C. | 600°~ 700° C. | 1200~ 1300° C. | 1300° C.~ |
| $LiAl_5O_8$ | $LiAl_5O_8$ | $LiAl_5O_8$ | $LiAl_5O_8$ | $LiAl_5O_8$ |
| $\gamma\text{-}LiAlO_2$ | $\gamma\text{-}LiAlO_2$ | $\gamma\text{-}LiAlO_2$ | $\gamma\text{-}LiAlO_2$ | $LiAl_5O_8$ |
| $\beta\text{-}LiAlO_2$ | $\beta\text{-}LiAlO_2$ | $\gamma\text{-}LiAlO_2$ | $\gamma\text{-}LiAlO_2$ | $LiAl_5O_8$ |
| $\alpha\text{-}LiAlO_2$ | $\alpha\text{-}LiAlO_2$ | $\gamma\text{-}LiAlO_2$ | $\gamma\text{-}LiAlO_2$ | $LiAl_5O_8$ |
| $Li_2Al_2O_4 \cdot yH_2O$ | $\beta\text{-}LiAlO_2$ | $\gamma\text{-}LiAlO_2$ | $\gamma\text{-}LiAlO_2$ | $LiAl_5O_8$ |

For the molten carbonate fuel cell which is operated at around 650° C., γ-lithium aluminate is the most stable among other lithium aluminates. Therefore, the sintering temperature should be selected so that the crystal structure of it does not change to $LiAl_5O_8$, i.e., 1100° C. to 1300° C.

EXPERIMENT 4

Molten carbonate fuel cells were constituted with the electrolyte plates obtained in Experiments 1, 2 and 3 and the performances of them were measured. The electrolyte plates used in this experiment are listed in Table 3 below.

TABLE 3

| No. | average particle size of γ-lithium aluminate (μm) | amount of pulp (%) | sintering temp (°C.) | void ratio (%) | electrolyte plate composition | |
|---|---|---|---|---|---|---|
| | | | | | porous sheet (wt %) | electrolyte (wt %) |
| 1 | 0.3 | 3 | 1200 | 50.5 | 52 | 48 |
| 2 | " | 10 | " | 53.5 | 50 | 50 |
| 3 | " | 15 | " | 55.0 | 48 | 52 |
| 4 | 0.6 | 15 | " | 56.5 | 47 | 53 |
| 5 | 1.0 | 3 | " | 56.5 | 47 | 53 |
| 6 | " | 10 | " | 61.5 | 42 | 58 |
| 7 | " | 15 | " | 63.5 | 40 | 60 |
| 8 | " | 10 | 1100 | 70.0 | 34 | 66 |
| 9 | " | " | 1200 | 61.5 | 42 | 58 |
| 10 | " | " | 1300 | 67.0 | 36 | 64 |

Also some electrolyte plates were prepared by using the paste method and the hot-press method in the following manners to obtain comparative data.

γ-$LiAlO_2$ powder was prepared by using γ-$Al_2O_3$ having average particle size of 0.01 μm and carbonates ($Li_2CO_3$) as row materials. A particle size of the γ-$LiAlO_2$ powder was 0.1–2 μm and particles are flocculated in a clamped state.

The γ-$LiAlO_2$ powder was cold-molded under a pressing force of 1 ton/cm² according to the paste method and then heated in an oxidizing atmosphere to a temperature of 500° C. and treated for 1 hour. A resultant porous ceramic plate had a bulk density of 2.08 g/cm³. An eutectic electrolyte (47.5 wt% $Li_2CO_3$) was introduced thereinto to provide an electrolyte plate such that the weight ratio thereof to the electrolyte plate becomes 50%.

γ-$LiAlO_2$ powder obtained in the same manner was filled in a metal mold, and the latter was heated in an oxidizing atmosphere to a temperature of 480° C. and held at the temperature for 1 hour under a load of 0.5 tons/cm². Thus a porous plate was prepared according to the hot-press method. The bulk density of the plate was 2.13 g/cm³.

Figure 8:
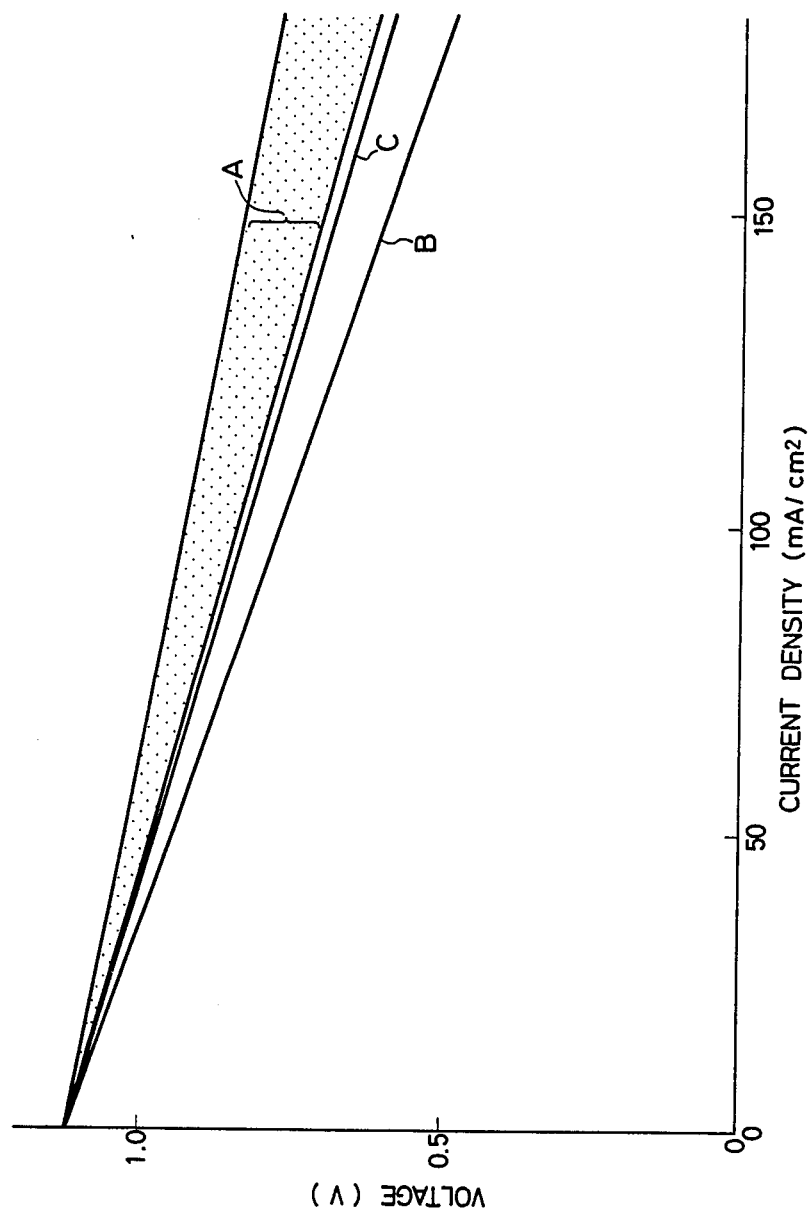
FIG. 8 is a graph showing current-voltage chracteristics of unit cells consutituted with the eletrolyte plates manufactured by different methods.
Figure 9:
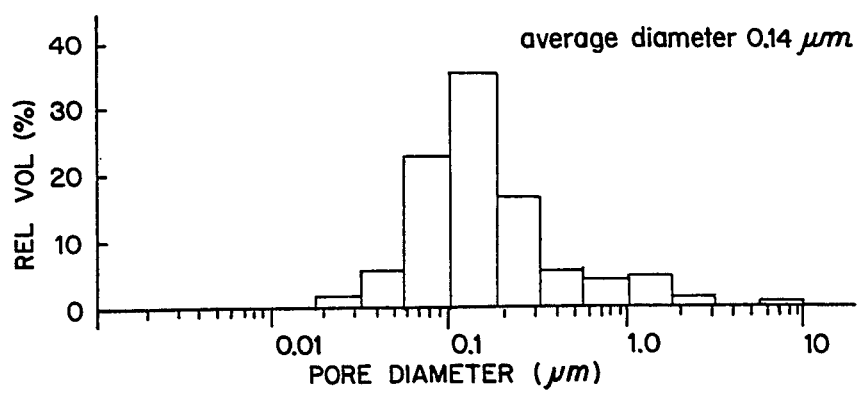
FIGS. 9 to 13 are graphs showing the distribution of pore size of the present ceramic plate.
Figure 10:
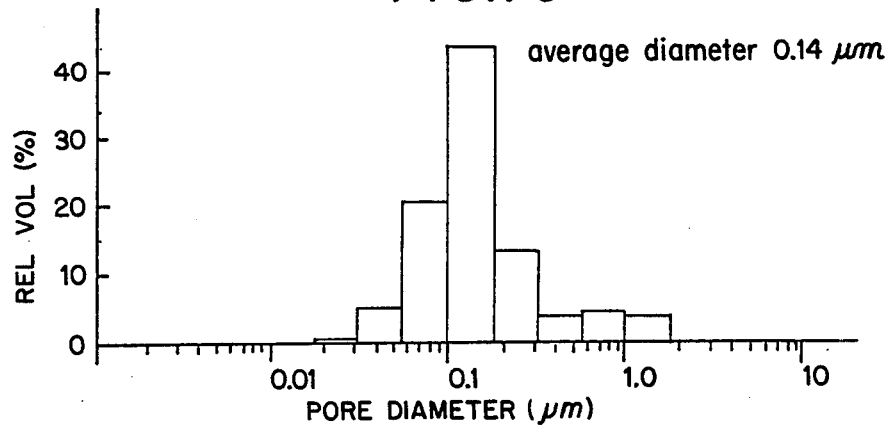
Figure 11:
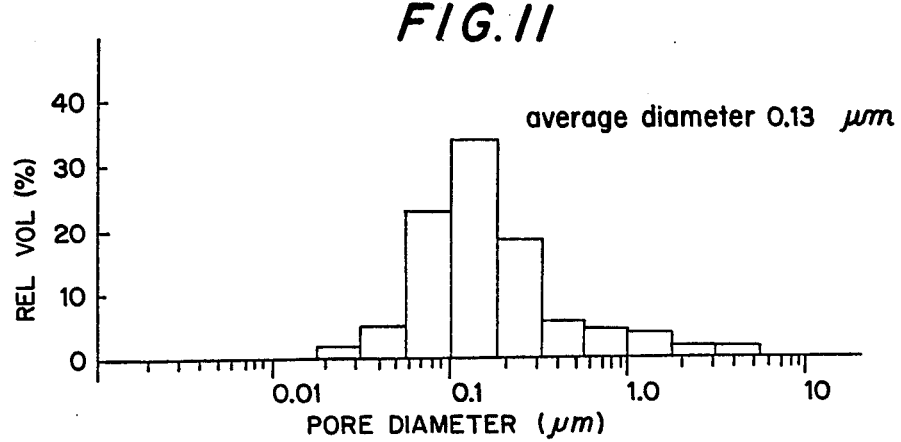
Figure 12:
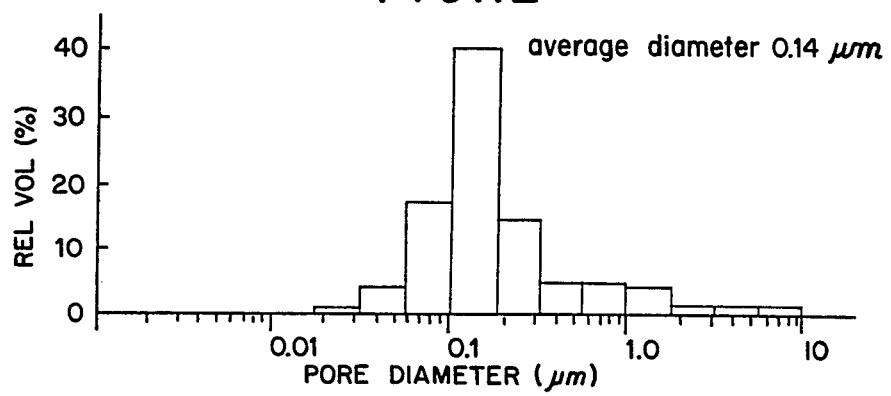
Figure 13:
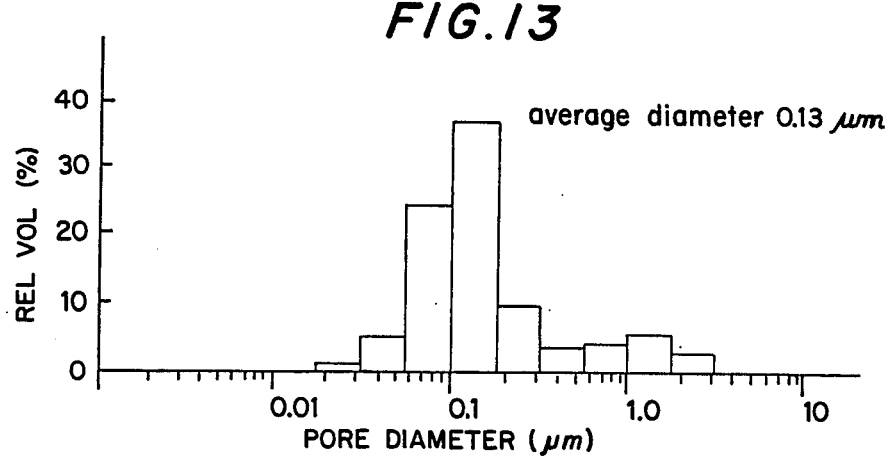

FIG. 8 shows the current-voltage chracteristics of the fuel cells. Various characteristic curves are obtained by the fuel cells according to the present invention which fall in a range shown by a letter A in FIG. 8. Characteristics obtained by a fuel cell using the electrolyte plates prepared by the paste method are shown by a curve B and a characteristics obtained by a fuel cell using the electrolyte plate prepared by the hot-press method are shown in a curve C. It is clear from FIG. 8 that any of the fuel cells each having the present electrolyte plate exhibits superior current-voltage characteristics than those of the fuel cells using the electrolyte plates prepared according to other methods than the present method.

According to the present invention, the pore size of the ceramic plate is distributed over a range of from 0.05 $\mu$m to 10 $\mu$m with an average pore size being 0.13 to 0.14 $\mu$m and at least 60% of the pores are distributed over a range of from 0.05 $\mu$m to 0.5 $\mu$m. This is shown in FIGS. 9 to 13 and Table 4 below.

TABLE 4

|  | —LiAlO₂ particle dia. ($\mu$m) | Amount of wood pulp (wt %) | Pressing pressure (Kg/cm²) | Sintering temp. (°C.) | Porosity (%) | Pore Size in 0.05-0.5 $\mu$m (%) |
| --- | --- | --- | --- | --- | --- | --- |
| FIG. 9 | 0.3 | 15 | 100 | 1200 | 55.0 | 80 |
| FIG. 10 | 0.6 | 15 | 100 | 1200 | 56.5 | 86 |
| FIG. 11 | 1.0 | 15 | 100 | 1200 | 63.5 | 79 |
| FIG. 12 | 0.3 | 3 | 100 | 1200 | 50.5 | 82 |
| FIG. 13 | 0.3 | 10 | 100 | 1200 | 53.5 | 75 |

This is clearly distinguishable from the pore size distribution of the ceramic plate prepared by the conventional doctor blade and hot press method.

Figure 14:
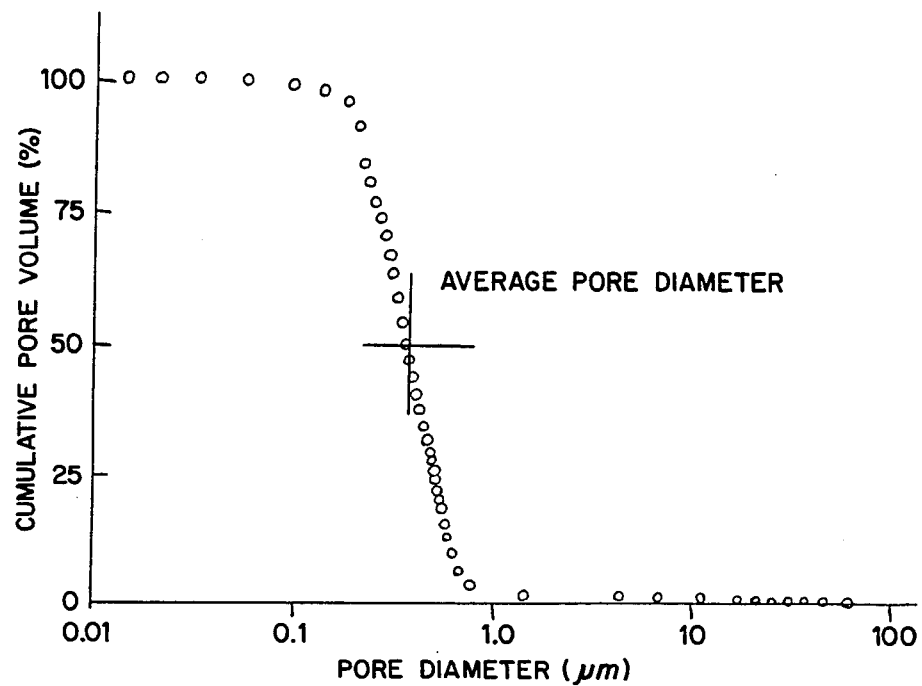
FIG. 14 is a figure from H. C. Mario, "Molten Salt Technologies", Vol. 2, page 15, Plenum, New York (1984) and is a graph showing the distribution of pore size of a ceramic plate made by a method similar to that of U.S. Pat. No. 4,526,845.

The pore size distribution of the ceramic plate disclosed in U.S. Pat. No. 4,526,845 is not disclosed. However, FIG. 14, which is disclosed in H. C. Mario, "Molten Salt Technologies", Vol. 2, page 15, Plenum, N.Y. (1984) may be used to show the general tendency of the pore size distribution of the ceramic plate of U.S. Pat. No. 4,526,845 because the data was obtained by using a method similar to that used in the aforementioned patent. As is seen in FIG. 14, the pore size is distributed in a range of from 0.01 $\mu$m to 70 $\mu$m.

In order for a porous ceramic plate to be suitable as an electrolyte plate, the pores must be continuous, the average pore size must be smaller than 0.2 $\mu$m, and the porosity must be 50-70%. Further, in order to ensure easy handling and reliable operation, the mechanical strength, which is indicated by the binding strength, should be higher than 70 Kg/cm². The plate should also be durable enough to withstand a heat cycle up to a temperature as high as about 600° C.

As described hereinbefore, the molten carbonate fuel cell according to the present invention provides a superior performance, which is supported by the electrolyte plate manufactured according to the present invention. The manufacturing method of the electrolyte plate can be easily performed by using any existing paper manufacturing apparatus and any existing tunnel kiln including the roller hearth kiln used in the ceramic industry. The area of the electrolyte plate and hence the size of the fuel cell can be easily selected and the manufacture of the electrolyte plate can be easily automated.

We claim:
1. A molten carbonate fuel cell comprising a porous anode plate; a fuel gas chamber defined on one surface of said anode plate and adapted to supply fuel gas to said one surface of said anode: a porous cathode plate; an oxidation agent chamber defined on one surface of said cathode plate and adapted to supply an oxidation agent to said one surface of said cathode plate; a sintered porous ceramic plate disposed in between the other surface of said anode plate and the other surface of said cathode plate in intimate contact therewith, said porous ceramic plate being formed with a number of fine continuous pores having diameters distributed in a range from 0.05 $\mu$m to 10 $\mu$m, at least 60% of said fine pores having diameters distributed in a range from 0.05 $\mu$m to 0.5 $\mu$m, said fine pores having an average diameter of not more than 0.2 $\mu$m to provide a porosity of 50-70%, said fine pores communicating one surface of said ceramic plate with the other; molten carbonate electrolyte that fills said fine pores of said sintered porous ceramic plate; and means for continuously supplying fuel gas and oxidizing agent to said fuel gas chamber and said oxidizing agent chamber, respectively.

2. The fuel cell claimed in claim 1, wherein said porous ceramic plate is a porous sheet made from $\gamma$-lithium aluminate powder having an average particle size of not more than 1 $\mu$m.

3. The fuel cell claimed in claim 1, wherein said porous ceramic plate has a thickness of 0.5-3 mm.

4. A method of manufacturing an electrolyte plate for use in a molten carbonate fuel cell, comprising the steps of:
    preparing a water slurry containing a predetermined amount of $\gamma$-lithium aluminate powder having an average particle size of not larger than 1 $\mu$m and a predetermined amount of organic textile material,
    adding a flocculating agent to said slurry to flocculate said $\gamma$-lithium aluminate powder on said organic textile materials and forming a wet sheet thereof by using a paper making technique,
    dehydrating said wet sheet to form a shaped sheet of $\gamma$-lithium aluminate containing 3-15 wt% organic textile material,
    burning said shaped sheet in an oxidizing atmosphere maintained at a temperature in a range from 1100° C. to 1300° C. to evaporate and remove said organic textile materials to thereby form a sintered $\gamma$-lithium aluminate porous sheet having fine labyrinthine and continuous pores, and
    impregnating said lithium aluminate porous sheet with molten carbonate electrolyte.

5. The method as claimd in claim 4, wherein the dehydrating step is performed by pressing said wet sheet, a pressing force being from 30 Kg/cm² to 200 Kg/cm².

6. The method as claimed in claim 5, wherein the pressing step is performed at a temperature increasing gradually from 60° C. to 150° C.

7. The method as claimed in claim 6, wherein the burning step is performed at a temperature increasing from normal temperature to said temperature range with an increasing rate of 100° C. per hour.

8. The method as claimed in claim 5, wherein the burning step is performed at a temperature increasing from normal temperature to said temperature range with an increasing rate of 100° C. per hour.

9. The method as claimed in claim 4, wherein the burning step is performed at a temperature increasing from normal temperature to said temperature range with an increasing rate of 100° C. per hour.

10. The method as claimed in claim 4, wherein said wet sheet has a thickness of 1–5 mm.

* * * * *